US012746720B2

(12) United States Patent
Ishikawa et al.

(10) Patent No.: US 12,746,720 B2
(45) Date of Patent: Sep. 29, 2026

(54) PRINTING SYSTEM AND METHOD OF PRODUCING REPLICA

(71) Applicant: SEIKO EPSON CORPORATION, Tokyo (JP)

(72) Inventors: Yuji Ishikawa, Matsumoto (JP); Toshifumi Sakai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 425 days.

(21) Appl. No.: 18/474,302

(22) Filed: Sep. 26, 2023

(65) Prior Publication Data

US 2024/0100776 A1 Mar. 28, 2024

(30) Foreign Application Priority Data

Sep. 28, 2022 (JP) ................................. 2022-155023

(51) Int. Cl.

| | |
|---|---|
| ***B33Y 30/00*** | (2015.01) |
| ***B29C 64/10*** | (2017.01) |
| ***B29C 64/386*** | (2017.01) |
| ***B33Y 10/00*** | (2015.01) |

(52) U.S. Cl.

CPC ............ *B29C 64/386* (2017.08); *B29C 64/10* (2017.08); *B33Y 10/00* (2014.12); *B33Y 30/00* (2014.12)

(58) Field of Classification Search

CPC ....... B29C 64/386; B29C 64/10; B33Y 10/00; B33Y 30/00; B41M 5/035; B41M 5/0094

See application file for complete search history.

(56) References Cited

U.S. PATENT DOCUMENTS

2003/0105538 A1* 6/2003 Wooten .................. B33Y 50/00 700/90
2012/0053716 A1* 3/2012 Bickel .................... B33Y 50/00 700/106
2012/0198676 A1* 8/2012 Rickenbacher ......... F01D 5/005 29/402.13
2014/0039663 A1* 2/2014 Boyer ................... B29C 64/118 700/118
2014/0074274 A1* 3/2014 Douglas ................ B29C 64/118 700/105
2014/0279177 A1* 9/2014 Stump ................ G06Q 30/0611 705/26.4
2016/0280403 A1* 9/2016 Colson ...................... A61J 1/03
2019/0250587 A1* 8/2019 Fenoglietto ............ B33Y 50/02

FOREIGN PATENT DOCUMENTS

JP 2003-132421 A 5/2003
JP 2022-106474 A 7/2022

* cited by examiner

*Primary Examiner* — Christopher E. Everett
(74) *Attorney, Agent, or Firm* — Spencer Fane LLP

(57) ABSTRACT

A printing system including: a scanner configured to scan a pattern on a surface of a three-dimensional object; a selection section configured to select a three-dimensional print medium corresponding to the three-dimensional object in accordance with scan data; and a print section configured to form a pattern on a surface of the selected print medium in accordance with the scan data to replicate the three-dimensional object.

7 Claims, 4 Drawing Sheets

| TYPE | PART NUMBER | SIZE | COLOR | STOCK QUANTITY |
|---|---|---|---|---|
| MUG | MG0001WH | OUTER DIAMETER ***, HEIGHT ***, ··· | WHITE | 100 |
| | MG0001IV | OUTER DIAMETER ***, HEIGHT ***, ··· | IVORY | 90 |
| | ··· | ··· | ··· | ··· |
| SMARTPHONE CASE | SP0001WH | LENGTH ***, WIDTH ***, HEIGHT ***, TOP OPENING (*,*), LENGTH ***, WIDTH ***; SIDE OPENING 1 (*,*), LENGTH ***, WIDTH ***; ··· | WHITE | 50 |
| | SP0002WH | LENGTH ***, WIDTH ***, HEIGHT ***, TOP OPENING (*,*), LENGTH ***, WIDTH ***; SIDE OPENING 1 (*,*), LENGTH ***, WIDTH ***; ··· | WHITE | 10 |
| | ··· | ··· | ··· | ··· |
| ··· | ··· | ··· | ··· | ··· |

PRINTING SYSTEM AND METHOD OF PRODUCING REPLICA

The present application is based on, and claims priority from JP Application Serial Number 2022-155023, filed Sep. 28, 2022, the disclosure of which is hereby incorporated by reference herein in its entirety.

BACKGROUND

1. Technical Field

The present disclosure relates to a printing system and a method of producing a replica.

2. Related Art

Techniques for printing on the surface of a three-dimensional object by using an articulated robot are known (for example, JP-A-2022-106474).

Development of a technique for improving user-friendliness at the time of replicating a three-dimensional object having a surface pattern is desired.

SUMMARY

According to an aspect of the present disclosure, there is provided a printing system including: a scanner configured to scan a pattern on a surface of a three-dimensional object; a selection section configured to select a three-dimensional print medium corresponding to the three-dimensional object in accordance with scan data; and a print section configured to form a pattern on a surface of the selected print medium in accordance with the scan data to replicate the three-dimensional object.

According to another aspect of the present disclosure, there is provided a method of forming a pattern, including: scanning a pattern on a surface of a three-dimensional object; selecting a three-dimensional print medium corresponding to the three-dimensional object in accordance with scan data; and forming a pattern in accordance with the scan data on a surface of the selected print medium.

DESCRIPTION OF EMBODIMENTS

A description will be given of embodiments of the present disclosure in the following order.

Figure 1:
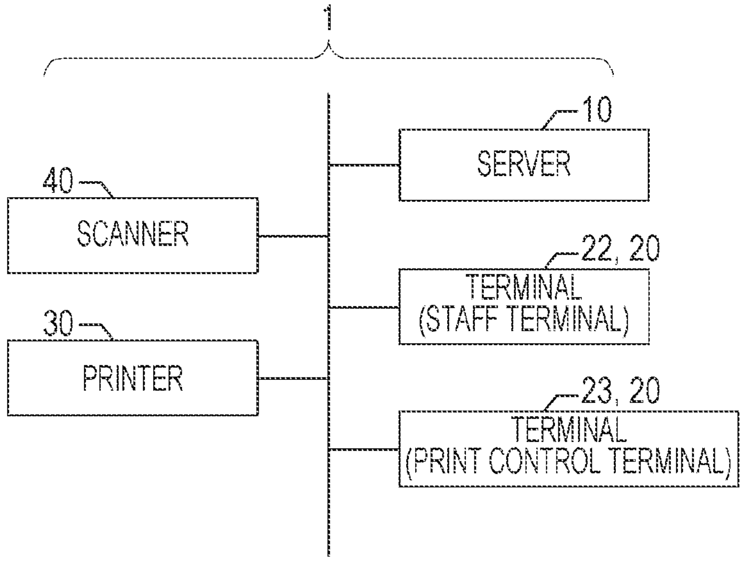
FIG. 1 is a block diagram of a printing system.

1. Printing System Configuration
1.1 Server Configuration
1.2 Terminal Configuration
1.3 Scanner Configuration
1.4 Printer Configuration
2. Replication Processing
3. Other Embodiments 1. Printing System Configuration FIG. 1 is a diagram schematically illustrating an example of a printing system according to an embodiment of the present disclosure. The printing system 1 includes a server 10, terminals 20, a printer 30, and a scanner 40. The number of devices illustrated in FIG. 1 is an example and is not limited. For example, the number of the plural terminals 20 is not limited as illustrated in FIG. 1, and the server 10, the scanner 40, and the printer 30, each of which is described as one device, may each be provided in plural. These devices are able to communicate with each other via various types of network, such as a local area network. Alternatively, devices that are located remotely may communicate with each other via the Internet or the like.

In the present embodiment, the terminals 20, the printer 30, and the scanner 40 are installed in a shop, such as a photo printing shop, a general shop, or the like. The terminal 20 includes a terminal (a staff terminal 22) used by a staff member of the shop and another terminal (a print control terminal 23) in which the printer driver of each printer 30 is installed. In this regard, these devices may be realized by the same device. The shop provides services for producing a replica of a three-dimensional object (a mug, a smartphone case, or the like) on which a pattern is already formed. Specifically, a three-dimensional object on which a pattern is formed is scanned by using the scanner 40, a print medium having a high matching rate with the mode (shape and color) of the three-dimensional object is selected from stock data, and the pattern on the surface of the three-dimensional object is formed on the selected print medium. A three-dimensional object on which a pattern is already formed may be assumed as an object that is brought in, for example, by a customer. In this regard, producing a replica in this application is not necessarily performed by creating a product identical to the original object and includes creating a product similar to the original object.

In the present embodiment, the printer 30 is a sublimation transfer method printer. To transfer an image on sublimation transfer paper printed by the printer 30, a press machine (for example, a mug-press machine for transferring an image onto the surface of a cylindrical object, such as a mug or the like, and a press machine for transferring an image onto a smartphone cover, or the like) is also installed in the shop.

In the following, a description will be given of the configuration of each device of the printing system 1 for realizing the replication service described above.

1.1 Server Configuration

Figure 2:
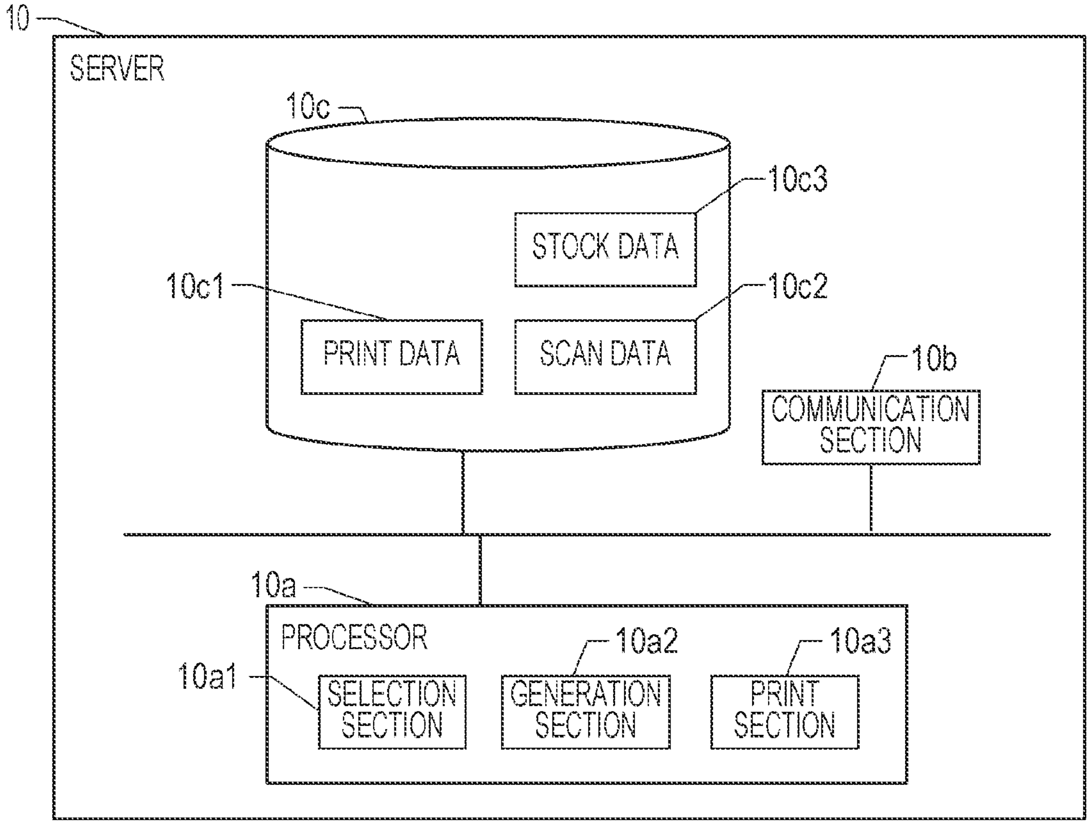
FIG. 2 is a block diagram of a server.

FIG. 2 is a block diagram illustrating the configuration of the server 10. The server 10 includes a processor 10*a*, a communication section 10*b*, and a nonvolatile memory 10*c*. The processor 10*a* includes a CPU, a ROM, a RAM, and the like, which are not illustrated in FIG. 2, and is able to execute various programs recorded in the nonvolatile memory 10*c* so as to control each section of the server 10 and each device coupled to the network. In this regard, the processor 10*a* may be constituted by a single chip, multiple chips, or a SoC with various functional blocks for operating the printer. Also, for example, an ASIC may be employed instead of the CPU, or the CPU and an ASIC may work in combination. When each device according to the present embodiment includes a processor, the processor is able to be realized in various modes in the same manner as the processor 10*a*.

The communication section 10*b* includes a communication interface for communicating with an external device in accordance with various wired or wireless communication protocols. The server 10 is able to communicate with another device via the communication section 10*b*. In this regard, the communication section 10*b* may include an interface for communicating with various removable memory of the server 10.

Figures 3, 4:
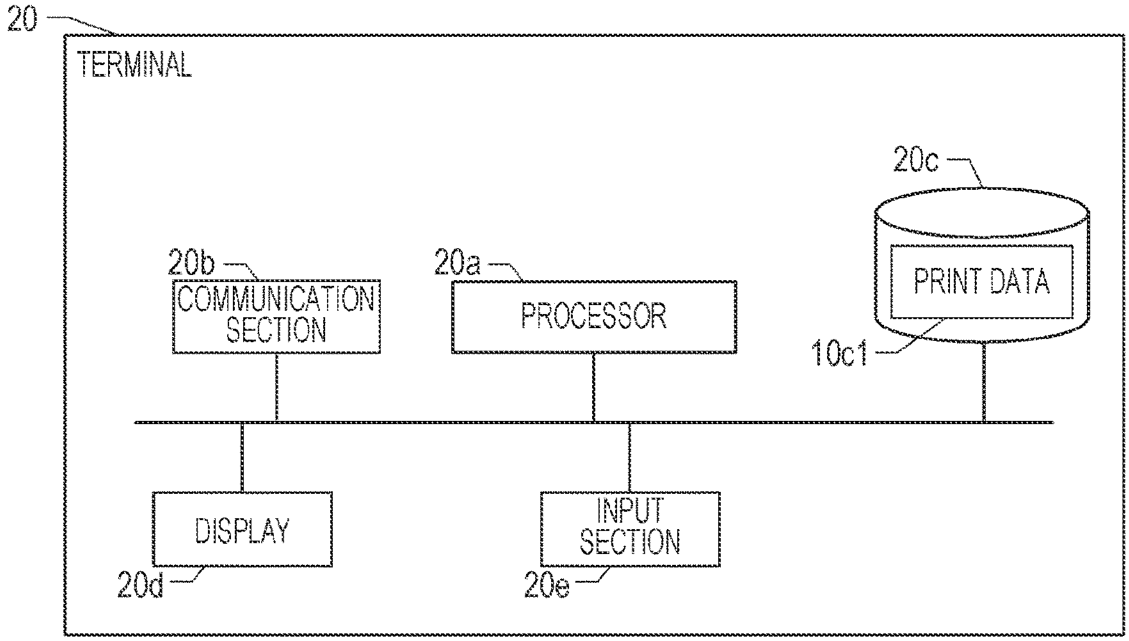
FIG. 3 is a diagram illustrating an example of stock data.
FIG. 4 is a block diagram of a terminal.

The nonvolatile memory 10*c* of the server 10 stores various kinds of information. For example, stock data 10*c*3 is recorded. The stock data 10*c*3 is data indicating the stock quantity for each type of the print medium handled at the shop. FIG. 3 is a diagram illustrating an example of the stock data 10*c*3. In the present embodiment, as illustrated in FIG. 3, a print medium is identified by a part number. The size of each part of the print medium and the color, and the stock quantity at the shop are recorded for each print medium.

Also, the nonvolatile memory 10*c* stores scan data 10*c*2 indicating a read result of the scanner 40. The scan data 10*c*2 includes data indicating the shape (the size of each part) of the contour of the scanned three-dimensional object and data indicating the pattern on the surface of the three-dimensional object. The data indicating the pattern on the surface includes a ground color part on which a design is not formed. Further, the nonvolatile memory 10*c* stores print data 10*c*1 generated in accordance with the scan data 10*c*2. In the present embodiment, the print data 10*c*1 represents the image produced by placing the pattern on the surface of the three-dimensional object in the same plane and is the image to be printed on sublimation transfer paper.

In the present embodiment, the processor 10*a* functions as a selection section 10*a*1 that selects a three-dimensional print medium corresponding to the three-dimensional object in accordance with the scan data 10*c*2. Also, the processor 10*a* functions as a generation section 10*a*2 that generates the print data 10*c*1 in accordance with the scan data 10*c*2. Also, the processor 10*a* functions as a print section 10*a*3 that forms a pattern in accordance with the print data on the surface of the selected print medium to replicate the three-dimensional object. A detailed description will be given later.

1.2 Terminal Configuration

FIG. 4 is a block diagram illustrating the configuration of the terminal 20. The terminal 20 includes a processor 20*a*, a communication section 20*b*, a nonvolatile memory 20*c*, a display 20*d*, and an input section 20*e*. The processor 20*a* includes a CPU, a ROM, a RAM, and the like, which are not illustrated in FIG. 4, and is able to execute various programs recorded in the nonvolatile memory 20*c* to control each section of the terminal 20.

The communication section 20*b* includes a communication interface for communicating with an external device in accordance with various wired or wireless communication protocols. The terminal 20 is able to communicate with another device via the communication section 20*b*. Also, the communication section 20*b* includes an interface for communicating with various removable memory of the terminal 20.

The display 20*d* is a display device for displaying any image. The input section 20*e* is constituted by a device for a user to perform an input operation and includes, for example, a keyboard, a mouse, a touch panel, or the like. In any case, it is possible for the user (a customer or a staff member) to realize their intention by operating the input section 20*e* while viewing an image or text displayed on the display 20*d*.

The staff member causes the scanner 40 to scan the three-dimensional object. The scan data is transmitted from the scanner 40 to the server 10 and is recorded in the nonvolatile memory 10*c*. The staff member is able to operate the staff terminal 22 to select the scan data 10*c*2 stored on the server 10 via a website provided by the server 10 and provide an instruction to select a three-dimensional print medium corresponding to the scanned three-dimensional object. In accordance with the scan data 10*c*2, the server 10 proposes, to the staff member via the website, the part number of the print medium to be selected, thereby enabling the staff member to know which print medium is to be used for replicating the three-dimensional object. The staff member specifies the number of print copies in accordance with the scan data 10*c*2 stored on the server 10 via the website and provides an instruction to start printing. The server 10 generates the print data 10*c*1 in accordance with the scan data 10*c*2 and transmits a print instruction to the print control terminal 23. The print instruction includes the identification information of the printer 30, the number of copies, print data (the image to be printed), print settings, and the like.

When the print control terminal 23 receives the print instruction from the server 10 via the communication section 20*b*, the print control terminal 23 uses the printer driver to convert the image of the print data to the print format of the specified printer 30 in accordance with the specified print settings and outputs the converted data to the printer 30 with the information on the number of copies.

1.3 Scanner Configuration

Figure 5:
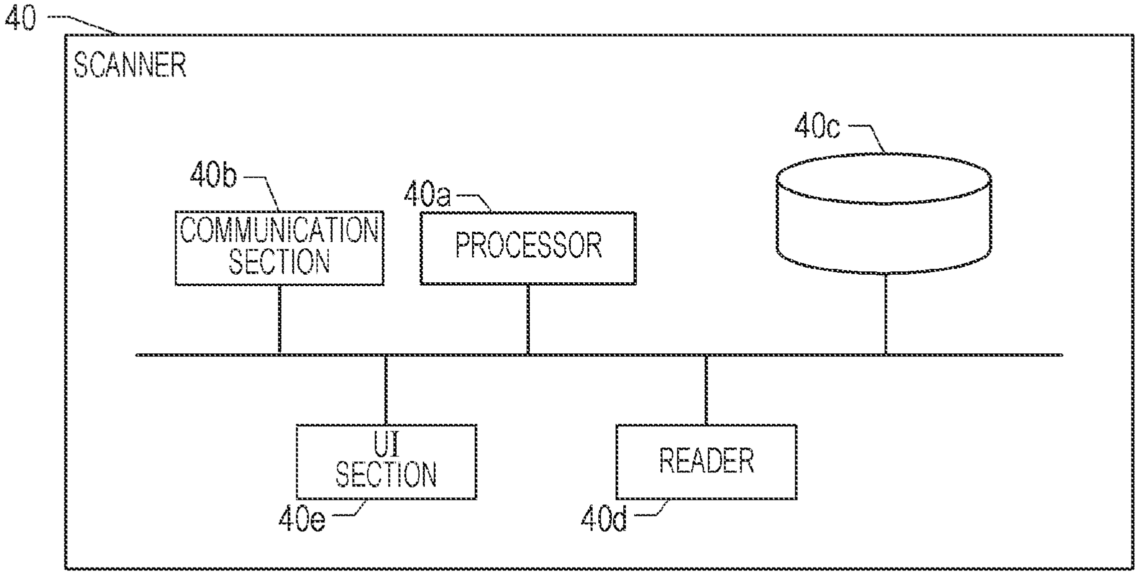
FIG. 5 is a block diagram of a scanner.

FIG. 5 is a block diagram illustrating the configuration of the scanner 40. The scanner 40 includes a processor 40*a*, a communication section 40*b*, a nonvolatile memory 40*c*, a reader 40*d*, and a UI section 40*e*. The processor 40*a* includes a CPU, a ROM, a RAM, and the like, which are not illustrated in FIG. 5, and is able to execute various programs recorded in the nonvolatile memory 40*c* to control each section of the scanner 40.

The communication section 40*b* includes a communication interface for communicating with an external device in accordance with various wired or wireless communication protocols. The scanner 40 is able to communicate with another device via the communication section 40*b*. In this regard, the communication section 40*b* may include an interface for communicating with various removable memory of the scanner 40.

The reader 40*d* is a section that reads the shape of the contour of the three-dimensional object and the surface pattern. The reader 40*d* may employ various methods, such as a stationary type, a handy type, or the like. In the present embodiment, the reader 40*d* includes, for example, a rotary table on which a three-dimensional object to be scanned is placed, an actuator that rotates the rotary table, machine parts, a light emission section that emits light (for example, a laser, an LED, or the like) onto the three-dimensional object placed on the table, and a sensor that reads reflected light, and the like. The processor 40*a* generates scan data including data indicating the 3D shape of the three-dimensional object and data indicating the surface pattern in accordance with the data generated by the reader 40*d*.

The UI section 40*e* includes a touch panel display, various keys, switches, and the like. The touch panel display includes a display panel that displays various kinds of information, such as the status of the scanner 40 and the like, and a touch detection panel layered on the display panel, and detects a touch operation. The processor 40*a* is able to obtain the operation contents performed by the staff member via the UI section 40*e*. Also, the processor 40*a* is able to display various kinds of information on the display of the UI section 40*e* to notify the staff member.

In the present embodiment, the scanner 40 is installed in a shop, such as a photo printing shop, a general shop, or the like, and scans a three-dimensional object, such as a mug, a smartphone case, or the like, in accordance with the operation performed by the staff member. The processor 40*a* of the scanner 40 transmits scan data, which is a scan result, to the server 10 via the communication section 40*b*. The server 10 stores the scan data 10*c*2.

1.4 Printer Configuration

Figure 6:
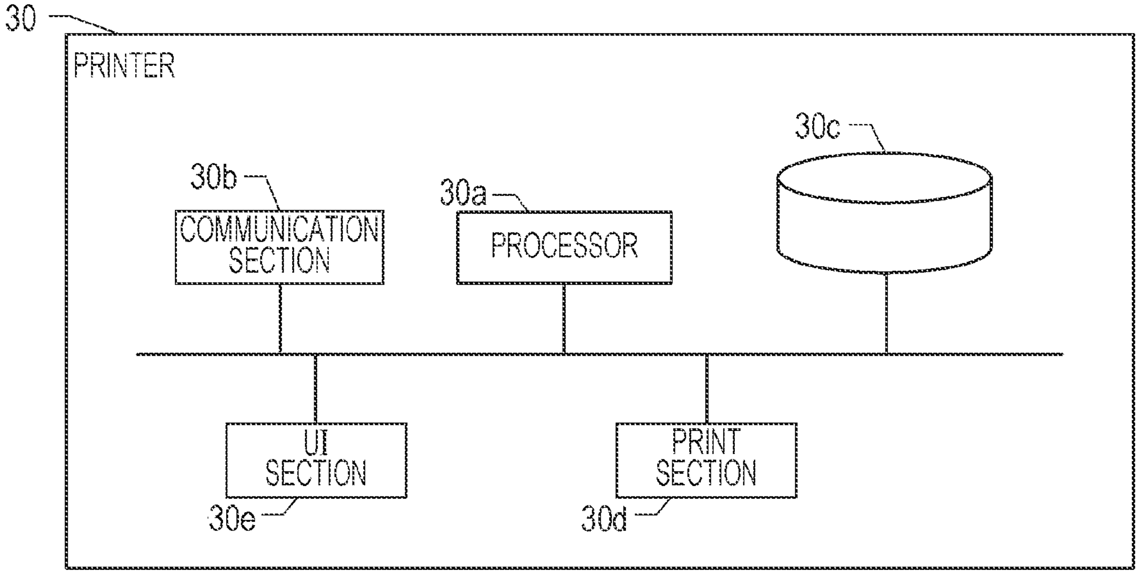
FIG. 6 is a block diagram of a printer.

FIG. 6 is a block diagram illustrating the configuration of the printer 30. The printer 30 includes a processor 30*a*, a communication section 30*b*, a nonvolatile memory 30*c*, a print section 30*d*, and a UI section 30*e*. The processor 30*a* includes a CPU, a ROM, a RAM, and the like, which are not illustrated in FIG. 6, and is able to execute various programs recorded in the nonvolatile memory 30*c* to control each section of the printer 30.

The communication section 30*b* includes a communication interface for communicating with an external device in accordance with various wired or wireless communication protocols. The printer 30 is able to communicate with another device via the communication section 30*b*. In this regard, the communication section 30*b* may include an interface for communicating with various removable memory of the printer 30.

The print section 30*d* is a section that directly or indirectly prints on the surface of the three-dimensional print medium and may employ various methods. In the present embodiment, a sublimation transfer method is assumed. That is, the print section 30*d* discharges sublimation transfer ink on sublimation transfer paper to form an image. The staff member places the sublimation transfer paper on which an image is formed on the surface of the three-dimensional print medium, such as a mug, a smartphone case, or the like, by applying pressure using a press machine (not illustrated in FIG. 6) to transfer the image onto the surface of the three-dimensional print medium. The print section 30*d* includes an actuator for performing printing on various media, various devices, sensors, drive circuits, machine parts, and the like. The sensors include a sensor that detects various detection targets that may change in the printer 30. The detection targets are not limited and, for example, include a sensor that detects the remaining amount of media, a sensor that detects the remaining amount of ink for each color used for printing, and the like.

The UI section 30*e* includes a touch panel display, various keys, a switch, and the like. The touch panel display includes a display panel that displays various kinds of information, such as the status of the printer 30, the remaining amount of ink, and the like, and a touch detection panel that is layered on the display panel and detects a touch operation. Also, the processor 30*a* is able to obtain the contents of the operation performed by the staff member via the UI section 30*e*. Also, the processor 30*a* is able to display various kinds of information on the display of the UI section 30*e* to notify the staff member.

In the present embodiment, the printer 30 is installed in a shop, such as a photo printing shop, a general shop, or the like, and performs printing in accordance with an order from a customer and a print instruction given by a staff member. The processor 30*a* of the printer 30 obtains the data converted to the print format of the printer 30 via the communication section 30*b* and controls the print section 30*d* to perform printing in accordance with the data. When printing ends, the processor 30*a* outputs, via the communication section 30*b*, the information indicating that the printing has ended. When the server 10 obtains the information via the communication section 10*b*, the processor 10*a* of the server 10 updates the progress information of the printed print data 10*c*1 to "Complete". Also, the server 10 subtracts the number of copies of the printed print media from the stock quantity to update the stock quantity of the print medium.

2. Replication Processing

Figure 7:
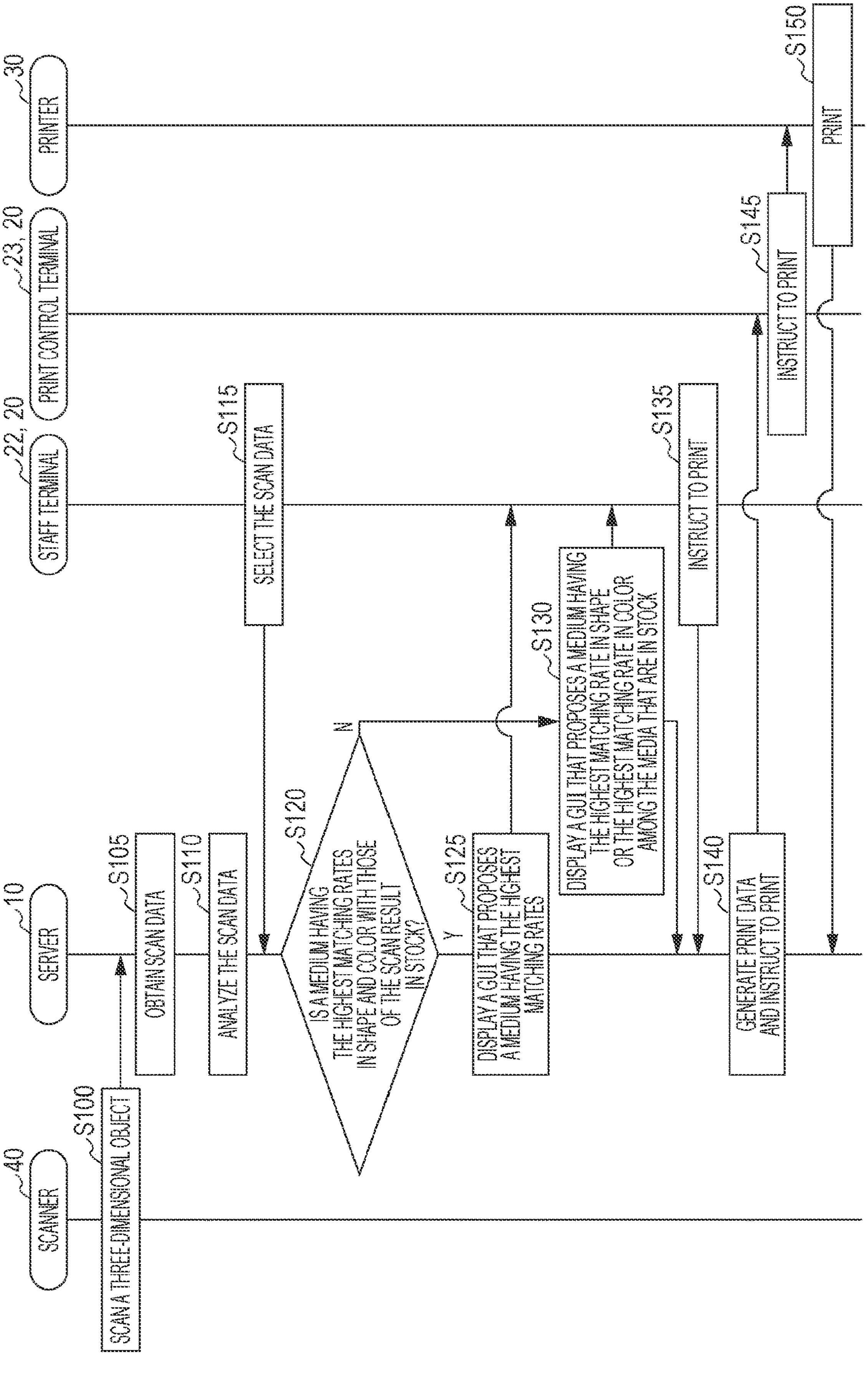
FIG. 7 is a sequence chart of replication processing.

FIG. 7 is a sequence chart of the replication processing. First, the scanner 40 scans a three-dimensional object in response to a scan instruction given by a staff member (step S100). That is, when the staff member places the three-dimensional object to be scanned on the table of the scanner 40 and provides an instruction to start scanning, the processor 40*a* of the scanner 40 controls the reader 40*d* to scan the three-dimensional object to generate scan data 10*c*2. The processor 40*a* transmits the scan data 10*c*2 from the scanner 40 to the server 10 via the communication section 40*b*.

When the server 10 receives the scan data 10*c*2 from the scanner 40, the server 10 records the scan data 10*c*2 in the nonvolatile memory 10*c*. By using the function of the selection section 10*a*1, the processor 10*a* obtains the scan data 10*c*2 newly recorded in the nonvolatile memory 10*c* (step S105) and analyzes the scan data 10*c*2 (step S110). Specifically, the processor 10*a* determines the type (refer to FIG. 3) of the three-dimensional object in accordance with the data indicating the shape of the three-dimensional object. The processor 10*a* matches the size of each part of the three-dimensional object indicated by the scan data 10*c*2 and the size of each part of each print medium in the stock data 10*c*3. Also, the processor 10*a* obtains the ground color of the surface of the three-dimensional object in accordance with the data indicating the pattern on the surface of the three-dimensional object. A part on which an image is not formed is determined in advance depending on the type of the three-dimensional object, and thus the processor 10*a* considers the color of the part to be the ground color of the three-dimensional object. For example, for a mug, the inside, the bottom face, and the like are determined in advance as the scanning parts for obtaining a ground color. For a smartphone case, the face in contact with the body of the smartphone and the like are determined in advance as the scanning parts for obtaining a ground color. The processor 10*a* obtains the color of the part as the ground color and matches it with the color of each medium of the stock data 10*c*3. The processor 10*a* then identifies the part number of a print medium having the highest matching rate in shape and in color.

In this regard, the processor 10*a* considers that the smaller the difference in the size of each part between the three-dimensional object and the print medium, the higher the matching rate in shape. By selecting a print medium having a high matching rate in shape, it is possible to increase the accuracy of a replica of the three-dimensional object in terms of shape. Also, it is possible for a staff member to expend less time and effort in selecting a print medium having a high matching rate in shape from the print media that are handled. Also, the processor 10*a* considers the matching rate in ground color between the three-dimensional object and the print medium to be higher as the difference (color distance) in ground color is smaller between the two. By selecting a print medium having a high matching rate in color, it is possible to increase the accuracy of the replica of the three-dimensional object in terms of color. Also, it is possible for the staff member to expend less time and effort to select a print medium having a high matching rate in ground color from the print media that are handled.

When the staff member operates the staff terminal 22 to select the scan data 10*c*2 of a print medium to be selected from the scan data 10*c*2 displayed on the website (step S115), the processor 10*a* of the server 10 determines by using the function of the selection section 10*a*1 whether or not a print medium having the highest matching rate with the shape and the color indicated by the scan data 10*c*2 is in stock (step S120). That is, the processor 10*a* determines by referring to the stock data 10*c*3 whether or not the print medium corresponding to the part number identified in step S110 is in stock. When the stock quantity of the print media is one or more, the processor 10*a* may determine that the print medium is in stock. Alternatively, when the number of the print media is the same as the order quantity of the replicas, the processor 10*a* may determine that the print media are in stock. By selecting a three-dimensional print medium corresponding to the three-dimensional object from the print medium in stock, it is possible to increase the possibility to promptly provide the customer with a replica of the three-dimensional object.

In step S120, when the print medium is determined to be in stock, by using the function of the selection section 10*al*, the processor 10*a* displays a GUI that proposes the use of the print medium having the highest matching rate (step S125). That is, the processor 10*a* transmits the display data that indicates the part number of the print medium having the highest matching rate to the staff terminal 22 via the communication section 10*b* and displays the part number on the staff terminal 22.

In step S120, when the print medium is determined not to be in stock, by using the function of the selection section 10*al*, the processor 10*a* displays a GUI that proposes the use of a medium having a high matching rate in shape or a medium having a high matching rate in color out of the print media in stock (step S130). When a print medium having a matching rate in shape that is high enough to meet predetermined criteria is available, the processor 10*a* transmits the display data that indicates the part number of the print medium having the highest matching rate to the staff terminal 22 out of the print media in stock. Here, the predetermined criteria regarding the matching rate in shape is, for example, the size difference of each part being less than or equal to a predetermined value. The predetermined value is a value determined in accordance with the type of the print medium. For example, the predetermined value for a smartphone case may be lower than the predetermined value for a mug and may be a value of assumed measurement error. When there are no print media in stock having the matching rate in shape that is high enough to meet the predetermined criteria, the processor 10*a* identifies a print medium having the highest matching rate in color and the highest matching rate in shape out of the print media in stock and transmits the display data that indicates the part number of the print medium to the staff terminal 22. That is, when there are no print media that have the highest matching rate in shape with respect to the three-dimensional object and the highest matching rate in ground color with the three-dimensional object out of the print media in stock, the processor 10*a* selects a print medium having the highest matching rate in shape with respect to the three-dimensional object more preferentially than the print medium having the highest matching rate in ground color with the three-dimensional object.

When the staff member approves use of the print medium having the part number proposed in step S125 or the print medium having the part number proposed in step S130, the staff member operates the staff terminal 22 to specify the printer 30 and gives a print instruction. As a result, the processor 20*a* of the staff terminal 22 transmits the print instruction to the server 10 (step S135). In this regard, when the staff member uses neither the print medium having the part number proposed in step S125 nor the print medium having the part number proposed in step S130 and wants to print on another print medium, the staff member operates the staff terminal 22 to change the print medium for printing to a desired print medium, specifies the printer 30, and gives a print instruction.

When receiving the print instruction from the staff terminal 22, by using the function of the generation section 10*a*2, the processor 10*a* of the server 10 generates print data and transmits a print instruction (step S140). That is, when receiving the print instruction from the staff terminal 22, the processor 10*a* generates print data in accordance with the scan data 10*c*2. More specifically, the processor 10*a* converts the data indicating the pattern on the surface in the scan data 10*c*2 to an image on the same plane, performs resolution conversion such that printing is performed at an appropriate size in the area to be printed on the surface of the selected print medium, and performs color conversion such that the printed result on the ground color of the print medium matches the color of the pattern on the surface in the scan data 10*c*2 so as to generate print data. In this regard, the staff terminal 22 may be configured to enable the staff member or the customer to perform fine adjustment on the print data. After generating the print data, the processor 10*a* transmits a print instruction for the selected printer 30 to the print control terminal 23. The server 10 hands over the identification information of the output destination printer, the print data (image to be printed), the number of copies, and the print settings to the print control terminal 23.

When receiving the print instruction from the server 10, the print control terminal 23 transmits a print instruction to the specified printer 30 (step S145). That is, the print control terminal 23 converts the print data (image to be printed) to the data in the format suitable for printing by the specified printer 30 in accordance with the print settings by using the printer driver and transmits the data to the printer 30. The printer 30 performs printing in accordance with the data transmitted from the print control terminal 23 (step S150). The printer 30 transmits print progress information to the server 10 via the print control terminal 23. When printing ends, the printer 30 transmits the progress information indicating print completion to the server 10 via the print control terminal 23. The processor 10*a* of the server 10 updates the progress information of the print data 10*c*1 and the stock data 10*c*3.

In the present embodiment, the server 10 causes the sublimation transfer printer 30 to print on sublimation transfer paper. The staff member places the print medium corresponding to the approved part number, which was proposed by the server 10, on the press machine (not illustrated in FIG. 7) corresponding to the print medium and crimps the printed sublimation transfer paper on the surface of the print medium so as to form the pattern in accordance with the print data on the surface of the print medium.

As described above, with the present embodiment, it is possible to improve the user-friendliness when replicating a three-dimensional object having a pattern on its surface. That is, it is possible for the staff member to expend less time and effort to select a print medium having a high matching rate in shape and color. As a result, it is possible to increase the possibility of preventing the waste of the print medium caused by a printing error.

3. Other Embodiments

The embodiment described above is only an example for carrying out the present disclosure, and various other embodiments may be employed. For example, the type of the printer described in the above embodiment is only an example, and another printer may be employed for forming an image on the surface of a three-dimensional print medium. In addition to the sublimation transfer method, a printer that directly prints on the three-dimensional object by using a robot arm or the like may be employed to form an image on the surface of a three-dimensional print medium. When an image is printed directly on the surface of a three-dimensional print medium, a guide section that guides and sets the selected medium at the position where the printer is able to print may be provided. Also, a different printer may be used for each type of print medium.

The print control terminal 23 may be omitted, and the printer 30 and the server 10 may be configured to transmit and receive data without going through the print control terminal 23. The scanner 40 and the server 10 may be configured to transmit and receive data via a terminal, such as a PC or the like. It may be assumed that the terminal and the printer are configured not to be installed at a shop where customers visit. The terminal may be installed at the shop, the printer may be installed in a printing facility of a print vendor, and a replica may be delivered from the printing facility to a requester. Also, the terminal is not limited to being installed in the shop, and the printing system may be configured such that a user is able to place an order, edit the print data, and give a final print instruction by using a portable terminal from various places.

The selection section may be configured as long as the processor is able to automatically select a three-dimensional print medium corresponding to the three-dimensional object in accordance with the scan data. A print medium having the highest matching rate in shape and in ground color may be proposed to be selected. Alternatively, a plurality of types of print media may be automatically selected and proposed by the processor in descending order of matching rate in shape and in ground color. The selection section may be configured such that the user is able to select a print medium out of the plurality of types of print media. In the case of selecting and proposing one print medium having the highest matching rate and in the case of selecting and proposing multiple print media, the selection section may be configured such that a print medium is selected from the print media having the matching rate in shape that is high enough to meet predetermined criteria or from the print media having the matching rate in ground color that is high enough to meet predetermined criteria. The predetermined criterion regarding the matching rate in ground color is, for example, the distance between the two colors; that is, the difference between the ground color of the three-dimensional object and the ground color of the print medium is less than or equal to a predetermined value. The selection section may be configured such that after a print medium having the highest matching rate is selected and proposed once, a change instruction of the print medium is received from a user, and the changed print medium is selected again. By doing so, it is possible to produce a replica by reflecting the request of the user (for example, a staff member or a customer). The selection section is not limited to making a selection directly in accordance with the matching rate in shape and in color of the print medium corresponding to the three-dimensional object read by the scan data. The selection section may be provided with a function of selecting a print medium corresponding to the three-dimensional object read by the scan data and then performing printing in accordance with the matching rate in shape and in color after desired processing is performed on the three-dimensional object. The desired processing is, for example, color restoration processing and magnification processing. By inputting what processing is desired in advance, it is possible to easily produce a replication having been subjected to the desired processing. Also, the processor may automatically select a three-dimensional print medium corresponding to the three-dimensional object in accordance with the scan data in consideration of the elements other than shape, ground color, and stock quantity. Specifically, the selection may be made in consideration of the quality of the material, the price, and the like. For the stock data, the description has been given of the example in which both the stock quantity and the information on the print medium, such as a size, a color, and the like, are stored. However, the information that is stored is not limited. Each data may be stored on a separate storage medium and on a separate computer, and the each data may be gathered for selecting a print medium. Also, the size and the color are not limited to being directly stored, and the scan data generated by scanning a print medium in three dimensions may be stored. In this case, the scan data of the print medium is generated under the same conditions, and the matching rate in shape and in ground color may then be compared between the scan data of the print medium and the scan data of the three-dimensional object.

The selection section may be configured to select a three-dimensional print medium corresponding to the three-dimensional object out of the print media in stock. Alternatively, an order may be received by selecting a medium having the highest matching rate out of the handled media regardless of the stock. When the medium having the highest matching rate is not in stock, the selection section may be configured to order the medium and may then perform printing and transfer after obtaining the medium. The selection section may be configured such that a staff member is able to select either one of the above in accordance with a customer demand.

The generation section needs only to be configured to generate print data in accordance with the scan data. For example, when the shape of a three-dimensional object to be scanned is a first shape and the ground color thereof is a first color, but there are no print media in stock that have the shape of the first shape and the ground color of the first color, a print medium whose ground color is a second color may be selected. Further, when a design is directly formed on the surface of the three-dimensional object, whose ground color is a first color, the generation section may be configured to generate an image in which the design is placed on the background of the first color as print data. By doing so, it is possible to reproduce the design using the ground color of the three-dimensional object on the print medium whose ground color is different from that of the three-dimensional object. In this regard, of course, the background of the ground color of the three-dimensional object may be not included in the print data, and only the design may be included in the print data. The generation section may be configured to make a proposal so that the user is able to select either one.

The present disclosure is applied as the disclosure of a method for producing a replica of a three-dimensional object. That is, the present disclosure is applied as a production method of a replica, which includes scanning the pattern on the surface of a three-dimensional object, selecting a three-dimensional print medium corresponding to the three-dimensional object in accordance with the scan data, generating print data in accordance with the scan data, and forming a pattern in accordance with the print data on the surface of the selected print medium to produce a replica of the three-dimensional object.

Further, it is possible to apply the present disclosure as a program performed by a computer or a method. Also, the above-described system, program, and method may be realized as a single device, or realized by using a part included in a plurality of devices, and may include various modes. Also, it is possible to suitably change a part of the disclosure; for example, one part may be software and another part may be hardware. Further, the disclosure may be realized as a recording medium of a program controlling a system. Of course, the program recording medium may be considered to be a magnetic recording medium, a semiconductor memory, or any recording medium to be developed in the future in the same manner.

What is claimed is:

1. A printing system comprising:

a scanner configured to scan a pattern on a surface of a three-dimensional object to obtain scan data;

a memory storing stock data indicating a stock quantity for each type of three-dimensional print media which are stocked and each of which has a three-dimensional shape; and a processor configured to select, from the three-dimensional print media, a three-dimensional print medium corresponding to the three-dimensional object based on the scan data and the stock data, and form a pattern on a surface of the selected print medium in accordance with the scan data to replicate the three-dimensional object.

2. The printing system according to claim 1, wherein the processor selects the print medium having a maximum matching rate in shape with respect to a shape of the three-dimensional object.

3. The printing system according to claim 1, wherein the processor selects the print medium having a maximum matching rate in ground color with respect to a ground color of the three-dimensional object.

4. The printing system according to claim 1, wherein when there is no print medium in stock that has a maximum matching rate in shape with respect to a shape of the three-dimensional object and a maximum matching rate in ground color with respect to a ground color of the three-dimensional object, the processor selects the print medium having a maximum matching rate in shape with respect to a shape of the three-dimensional object more preferentially than the print medium having a maximum matching rate in ground color with respect to a ground color of the three-dimensional object among the print media in stock.

5. The printing system according to claim 1, wherein the processor selects the three-dimensional print medium corresponding to the three-dimensional object in accordance with the scan data then receives an instruction from a user to change the print medium and reselects the changed print medium.

6. A method of forming a pattern, comprising:

scanning a pattern on a surface of a three-dimensional object to obtain scan data;

storing stock data indicating a stock quantity for each type of three-dimensional print media which are stocked and each of which has a three-dimensional shape;

selecting, from the three-dimensional print media, a three-dimensional print medium corresponding to the three-dimensional object based on the scan data and the stock data; and forming a pattern in accordance with the scan data on a surface of the selected print medium.

7. A non-transitory computer-readable storage medium storing a program, the program causing a computer to perform processing comprising:

scanning a pattern on a surface of a three-dimensional object to obtain scan data;

storing stock data indicating a stock quantity for each type of three-dimensional print media which are stocked and each of which has a three-dimensional shape;

selecting, from the three-dimensional print media, a three-dimensional print medium corresponding to the three-dimensional object based on the scan data and the stock data; and forming a pattern in accordance with the scan data on a surface of the selected print medium.

* * * * *